United States Patent
Hui et al.

(10) Patent No.: US 9,300,569 B2
(45) Date of Patent: Mar. 29, 2016

(54) COMPRESSING DATA PACKET ROUTING INFORMATION USING BLOOM FILTERS

(75) Inventors: Jonathan W. Hui, Belmont, CA (US); Jean-Philippe Vasseur, Saint Martin d'Uriage (FR); Wei Hong, Berkeley, CA (US)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 13/563,077

(22) Filed: Jul. 31, 2012

(65) Prior Publication Data
US 2014/0036925 A1 Feb. 6, 2014

(51) Int. Cl.
*H04L 12/54* (2013.01)
*H04L 12/721* (2013.01)
*H04L 12/751* (2013.01)
*G06F 17/30* (2006.01)
*H04L 12/743* (2013.01)

(52) U.S. Cl.
CPC ............ *H04L 45/14* (2013.01); *H04L 12/5695* (2013.01); *G06F 17/30162* (2013.01); *H04L 45/02* (2013.01); *H04L 45/12* (2013.01); *H04L 45/7453* (2013.01)

(58) Field of Classification Search
CPC .................................................. H04L 12/5695
USPC ............. 370/400, 392, 395.3, 395.31, 395.32
See application file for complete search history.

(56) References Cited

U.S. PATENT DOCUMENTS

| | | | |
|---|---|---|---|
| 5,784,557 A * | 7/1998 | Oprescu | 709/220 |
| 6,633,886 B1 * | 10/2003 | Chong | 707/798 |
| 6,771,824 B1 * | 8/2004 | Chiu et al. | 382/233 |
| 6,839,413 B1 | 1/2005 | Brock et al. | |
| 7,277,102 B2 * | 10/2007 | Moore | 345/629 |
| 7,283,563 B1 * | 10/2007 | Allan | 370/469 |
| 7,453,883 B1 | 11/2008 | Lynch et al. | |
| 7,584,507 B1 * | 9/2009 | Nucci | 726/23 |
| 7,602,785 B2 * | 10/2009 | Dharmapurikar et al. | 370/392 |
| 7,603,464 B2 * | 10/2009 | White | 709/226 |
| 7,852,852 B2 | 12/2010 | Lynch et al. | |
| 7,885,294 B2 | 2/2011 | Patel et al. | |
| 7,933,946 B2 * | 4/2011 | Livshits et al. | 709/200 |
| 8,059,551 B2 * | 11/2011 | Milliken | 370/252 |
| 8,136,159 B2 * | 3/2012 | Koo et al. | 726/23 |
| 8,385,343 B2 * | 2/2013 | Lim | 370/392 |
| 8,583,919 B2 * | 11/2013 | Sarela et al. | 713/163 |

(Continued)

OTHER PUBLICATIONS

Thubert, "RPL Objective Function 0", <draft-ietf-roll-of0-03>, IETF Trust, Internet Draft, Jul. 2010, pp. 1-10.

(Continued)

*Primary Examiner* — Andrew Lai
*Assistant Examiner* — Andrew C Lee
(74) *Attorney, Agent, or Firm* — Parker Ibrahim & Berg LLC; James M. Behmke; Stephen D. LeBarron

(57) ABSTRACT

In one embodiment, a Transit Information Bloom Filter (TIBF) signal component is generated for use with a routing protocol control message, the TIBF signal component identifying at least one parent node for a corresponding routing topology. The TIBF signal component is encoded in a generated Bloom filter. The parameters of the generated Bloom filter are based at least on one parent node to be encoded and a desired false positive rate for the Bloom filter. The address for each parent node is also encoded in the Bloom filter.

23 Claims, 5 Drawing Sheets

(56) References Cited

U.S. PATENT DOCUMENTS

| | | | |
|---|---|---|---|
| 8,625,604 B2 * | 1/2014 | Bando et al. | 370/395.31 |
| 8,898,204 B1 * | 11/2014 | Sathe et al. | 707/812 |
| 8,953,472 B2 * | 2/2015 | Di Pietro et al. | 370/252 |
| 2006/0184690 A1 * | 8/2006 | Milliken | 709/238 |
| 2007/0156842 A1 * | 7/2007 | Vermeulen et al. | 709/217 |
| 2008/0186974 A1 * | 8/2008 | Singh et al. | 370/395.3 |
| 2010/0318795 A1 * | 12/2010 | Haddad et al. | 713/168 |
| 2011/0110370 A1 | 5/2011 | Moreno et al. | |
| 2011/0116389 A1 * | 5/2011 | Tao et al. | 370/252 |
| 2011/0128959 A1 * | 6/2011 | Bando et al. | 370/392 |
| 2011/0137930 A1 * | 6/2011 | Hao et al. | 707/769 |
| 2011/0145578 A1 * | 6/2011 | Asano et al. | 713/169 |
| 2011/0149973 A1 * | 6/2011 | Rothenberg et al. | 370/392 |
| 2011/0191342 A1 * | 8/2011 | Cohen et al. | 707/737 |
| 2011/0202761 A1 * | 8/2011 | Sarela et al. | 713/163 |
| 2013/0166576 A1 * | 6/2013 | Hudzia et al. | 707/754 |

OTHER PUBLICATIONS

Vasseur, et al., "Routing Metrics Used for Path Calculation in Low Power and Lossy Networks" <draft-ietf-roll-routing-metrics-12, IETF Trust, Network Wiorking Group, Internet Draft, Nov. 2010, pp. 1-31.

Winter, et al., "RPL: IPv6 Routing Protocol for Low-Power and Lossy Networks", IETF Trust, Request for Comments 6550, Mar. 2012, 158 pages.

* cited by examiner

COMPRESSING DATA PACKET ROUTING INFORMATION USING BLOOM FILTERS

TECHNICAL FIELD

The present disclosure relates generally to computer networks, and, more particularly, to a bloom filter used with data packets to compress data packet routing information.

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or processing capability, etc. One example routing solution to LLN challenges is a protocol called Routing Protocol for LLNs or "RPL," which is a distance vector routing protocol that builds a Destination Oriented Directed Acyclic Graph (DODAG) in addition to a set of features to bound control traffic, support local (and slow) repair, etc. The RPL routing protocol provides a flexible method by which each node performs DODAG discovery, construction, and maintenance.

One problem that confronts LLNs is the relative large size of RPL control messages. One reason why RPL control messages are large is because they often contain full IPv6 addresses, which are typically large in size. It is noted that RPL control messages use DAO messages to install downward routes, and in a non-storing mode, the DAO message contains one or more RPL Transit Information Options that indicate the full IPv6 addresses of the DAG parents of the source. To process links having time-varying link qualities, a typical RPL implementation involves having each RPL router maintain multiple DAG parents. Thus, having more parents increases the robustness to any link failures that may occur. Unfortunately, the number of parents directly affects the size of each DAO message. For instance, a RPL control message typically requires 22 bytes for each Transit Information Option (16 bytes of which is attributable to the IPv6 address), which has proven to be large and is disadvantageous since it creates unwanted overhead in communication schemes.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
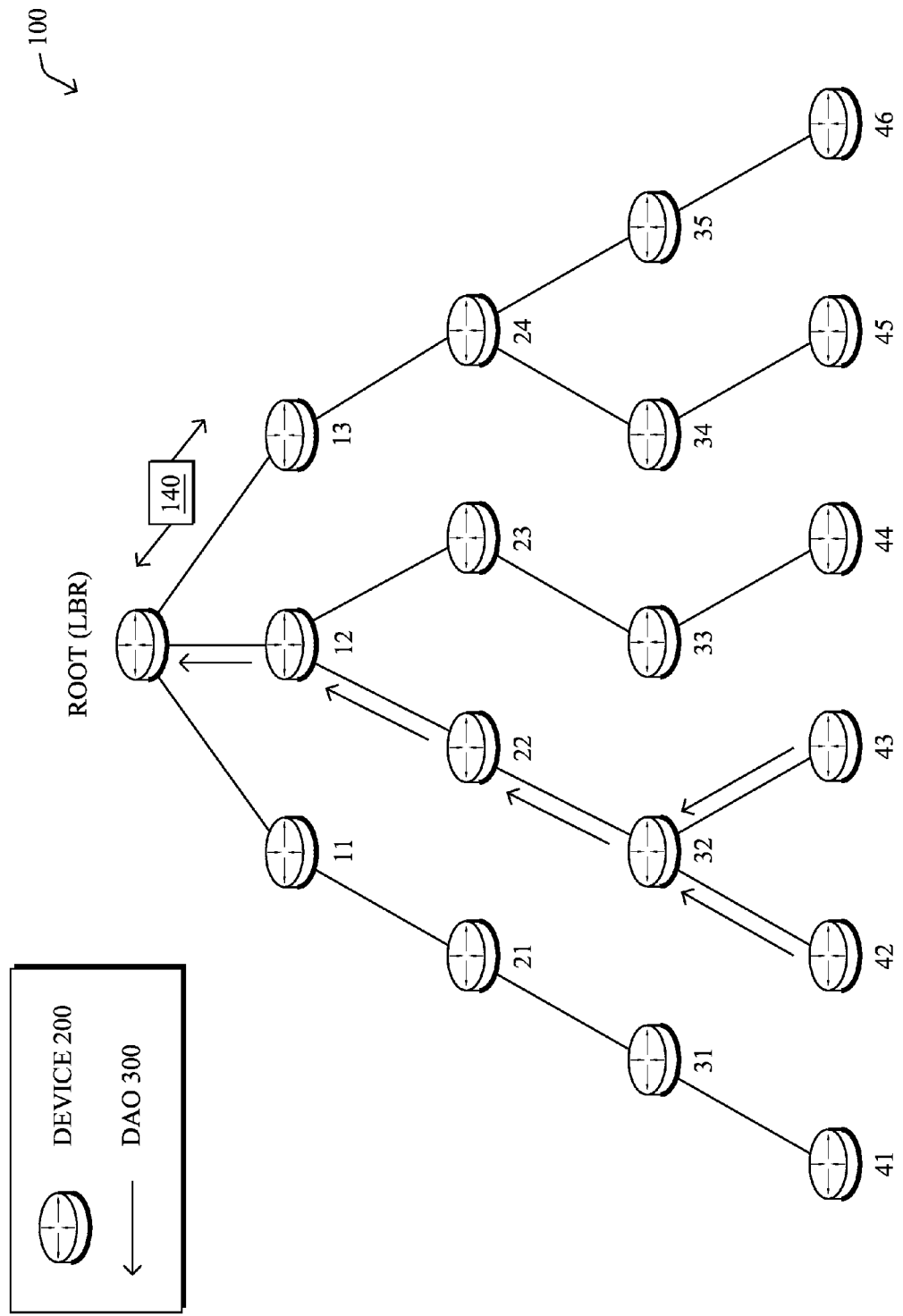
FIG. 1 illustrates an example computer network and a directed acyclic graph (DAG)

According to one or more embodiments, a Transit Information Bloom Filter (TIBF) signal component is generated for use with a routing protocol control message, the TIBF signal component identifying at least one parent node for a corresponding routing topology. The TIBF signal component is encoded in a generated Bloom filter. The parameters of the generated Bloom filter are based at least on one parent node to be encoded and a desired false positive rate for the Bloom filter. The address for each parent node is also encoded in the Bloom filter.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, CPL G3, WPC and others. In addition, a Mobile Ad-Hoc Network (MANET) is a type of wireless ad-hoc network, which is generally considered a self-configuring network of mobile routes (and associated hosts) connected by wireless links, the union of which forms an arbitrary topology.

Smart object networks, such as sensor networks in particular, are a specific type of network consisting of spatially distributed autonomous devices such as sensors that cooperatively monitor physical or environmental conditions at different locations, such as, e.g., temperature, pressure, vibration, sound, radiation, motion, pollutants, etc. Other types of smart objects include actuators, e.g., objects responsible for turning on/off an engine or performing other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from devices in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement, and transmit that result) to the sensor sink. (Those skilled in the art will appreciate the benefits and shortcomings of each mode, and both apply to the techniques described herein.)

FIG. 1 is a schematic block diagram of an example computer network 100 illustratively comprising nodes/devices 200, such as, e.g., routers, sensors, computers, etc., interconnected by various methods of communication (e.g., and labeled as shown, "LBR," "11," "12," ... "46"). For instance, the links of the computer network may be wired links or may comprise a wireless communication medium, where certain nodes 200 of the network may be in communication with other nodes 200, e.g., based on distance, signal strength, current operational status, location, etc. Those skilled in the art will understand that any number of nodes, devices, links, etc. may be used in the computer network, and that the view shown herein is for simplicity. Illustratively, certain devices in the network may be more capable than others, such as those devices having larger memories, sustainable non-battery power supplies, etc., versus those devices having minimal memory, battery power, etc. For instance certain devices 200 may have no or limited memory capability. Also, one or more of the devices 200 may be considered "root nodes/devices" (or root capable devices) while one or more of the devices may also is be considered "destination nodes/devices."

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), various proprietary protocols, etc. In this context, a protocol consists of a set of rules defining how the nodes interact with each other. In addition, packets within the network 100 may be transmitted in a different manner depending upon device capabilities, such as source routed packets.

Figure 2:
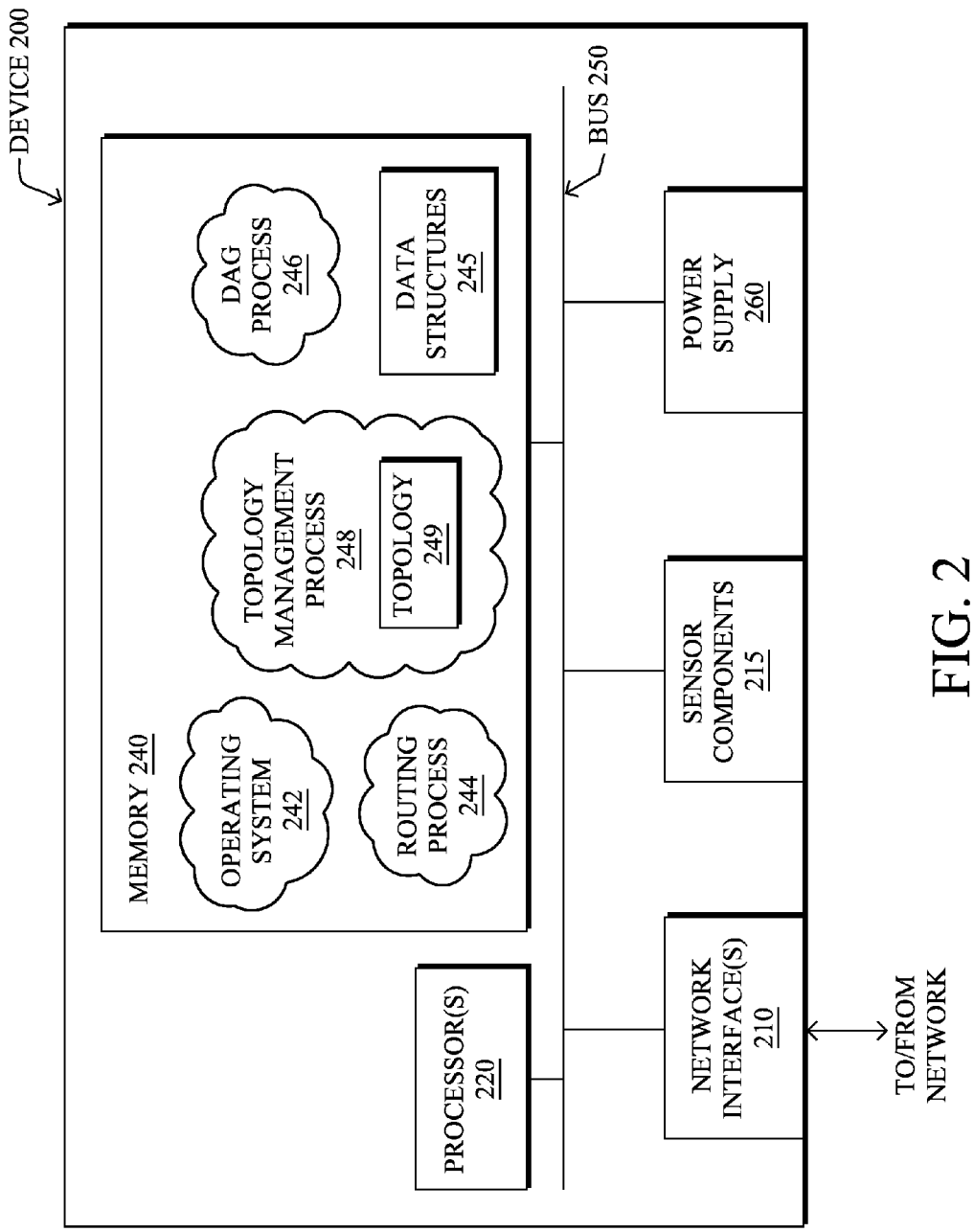
FIG. 2 illustrates an example network device/node.

FIG. 2 is a schematic block diagram of an example node/device 200 that may be used with one or more embodiments described herein, e.g., as a root node or sensor. The device may comprise one or more network interfaces 210, one or more sensor components 215 (e.g., sensors, actuators, etc.), a power supply 260 (e.g., battery, plug-in, etc.), one or more processors 220 (e.g., 8-64 bit microcontrollers), and a memory 240 interconnected by a system bus 250. The network interface(s) 210 contain the mechanical, electrical, and signaling circuitry for communicating data over physical and/or wireless links coupled to the network 100. The network interface(s) may be configured to transmit and/or receive data using a variety of different communication protocols, including, inter alia, TCP/IP, UDP, wireless protocols (e.g., IEEE Std. 802.15.4, WiFi, Bluetooth (Registered trademark),), Ethernet, powerline communication (PLC) protocols, etc.

The memory 240 comprises a plurality of storage locations that are addressable by the processor(s) 220 and the network interface(s) 210 for storing software programs and data structures associated with the embodiments described herein. As noted above, certain devices may have limited memory or no memory (e.g., no memory for storage other than for programs/processes operating on the device). The processor(s) 220 may comprise necessary elements or logic adapted to execute the software programs and manipulate the data structures, such as routes or prefixes of a routing/forwarding table 245 (notably on capable devices only). An operating system 242, portions of which are typically resident in memory 240 and executed by the processor(s), functionally organizes the device by, inter alia, invoking operations in support of software processes and/or services executing on the device. These software processes and/or services may comprise routing process/services 244, which may include an illustrative directed acyclic graph (DAG) process 246. Also, for root devices (or other management devices), a topology management process 248 and associated stored topologies 249 may be present in memory 240, for use as described herein. It will be apparent to those skilled in the art that other processor and memory types, including various computer-readable media, may be used to store and execute program instructions pertaining to the techniques described herein. Also, while the description illustrates various processes, it is expressly contemplated that the various processes may be embodied as modules configured to operate in accordance with the techniques herein (e.g., according to the functionality of a similar process).

Routing process (services) 244 contains computer executable instructions executed by the processor(s) 220 to perform functions provided by one or more routing protocols, such as proactive or reactive routing protocols as will be understood by those skilled in the art. These functions may, on capable devices, be configured to manage routing/forwarding table 245 containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can direct the less capable devices exactly where to send the packets, and the less capable devices simply forward the packets as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) A number of use cases require specifying a set of link and node metrics, some of them being dynamic, thus requiring specific smoothing functions to avoid routing instability, considerably draining bandwidth and energy;

4) Constraint-routing may be required by some applications, e.g., to establish routing paths that avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnects are constrained; LLN routers typically operate with constraints, e.g., processing power, memory, and/or energy (battery), and their interconnects are characterized by, illustratively, high loss rates, low data rates, and/or instability. The LLN may be sized with devices ranging from a few dozen to as many as thousands or even millions of LLN routers, and may support point-to-point traffic (between devices inside the LLN), point-to-multipoint traffic (from a central control point to a subset of devices inside the LLN) and multipoint-to-point traffic (from devices inside the LLN towards a central control point).

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc.

A DAG is a directed graph that represents a computer network, such as computer network 100, and that has the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or, as used herein, one preferred parent.

DAGs may generally be built based on an Objective Function (OF). The role of the Objective Function is generally to specify rules on how to build the DAG (e.g. number of parents, backup parents, etc.).

In addition, one or more metrics/constraints may be advertised by the routing protocol to optimize the DAG. Also, the routing protocol allows for including an optional set of constraints to compute a constrained path, such as where if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, estimated transmission count (ETX), etc., while example constraints that may be placed on the route selection may comprise various reliability thresholds, restrictions on battery operation, multipath diversity, load balancing requirements, bandwidth requirements, transmission types (e.g., wired, wireless, etc.), and also a number of selected parents (e.g., single parent trees or multi-parent DAGs). Notably, an example for how routing metrics may be obtained may be found in an IETF Internet Draft, entitled "Routing Metrics used for Path Calculation in Low Power and Lossy Networks"<draft-ietf-roll-routing-metrics-12> by Vasseur, et al. (Nov. 10, 2010 version). Further, an example OF (e.g., a default OF) may be found in an IETF Internet Draft, entitled "RPL Objective Function 0" <draft-ietf-roll-of 0-03> by Thubert (Jul. 29, 2010 version).

Building of a DAG may utilize a discovery mechanism to build a logical representation of the network, and route dissemination to establish state within the network so that routers know how to forward packets toward their ultimate destinations. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going against the orientation of the edges within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward (UP) direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root which can, in turn, build the topology and locally compute downward routes to all nodes in the DODAG. Such nodes are then reachable using source routing techniques over regions of the DAG that are incapable of storing downward routing state.

Figure 3:
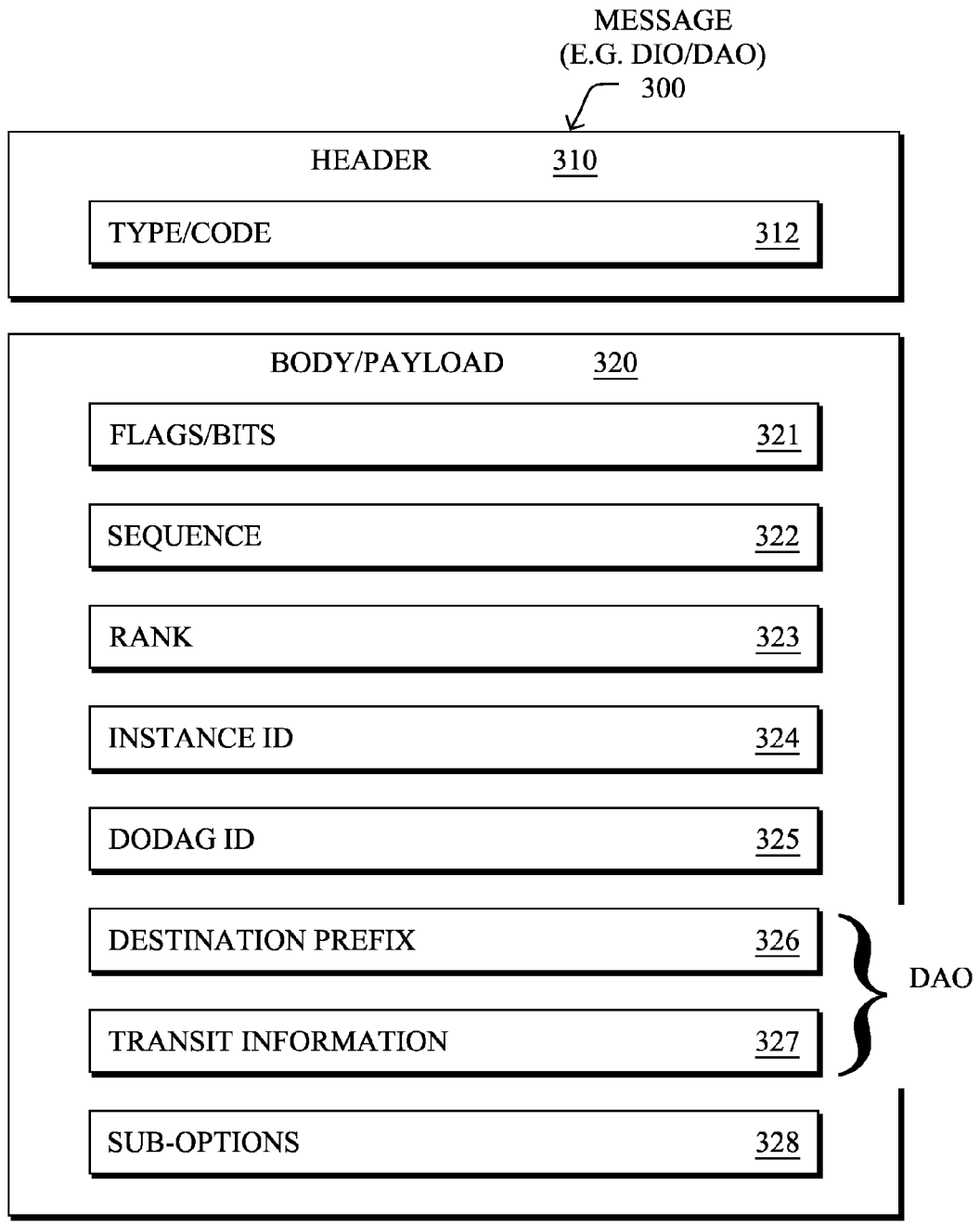
FIG. 3 illustrates an example message.

FIG. 3 illustrates an example message 300 with a simplified control message format that may be used for discovery and route dissemination when building a DAG, e.g., as a DIO or DAO. Message 300 illustratively comprises a header 310 having one or more fields 312 that identify the type of message (e.g., a RPL control message) and a specific code indicating the specific type of message, e.g., a DIO or a DAO (or a DAG Information Solicitation). A body/payload 320 of the message may comprise a plurality of fields used to relay pertinent information. In particular, the fields may comprise various flags/bits 321, a sequence number 322, a rank value 323, an instance ID 324, a (DO)DAG ID 325, and other fields, each as may be appreciated in more detail by those skilled in the art. Further, for DAO messages, fields for a destination prefix 326 and a reverse route stack 327 may also be included. For either DIOs or DAOs, one or more additional sub-option fields 328 may be used to supply additional or custom information (such as, e.g., is the VGF) within the message 300. For instance, an objective code point (OCP) sub-option field may be used within a DIO to carry codes specifying a particular objective function (OF) to be used for building the associated DAG.

Figure 4:
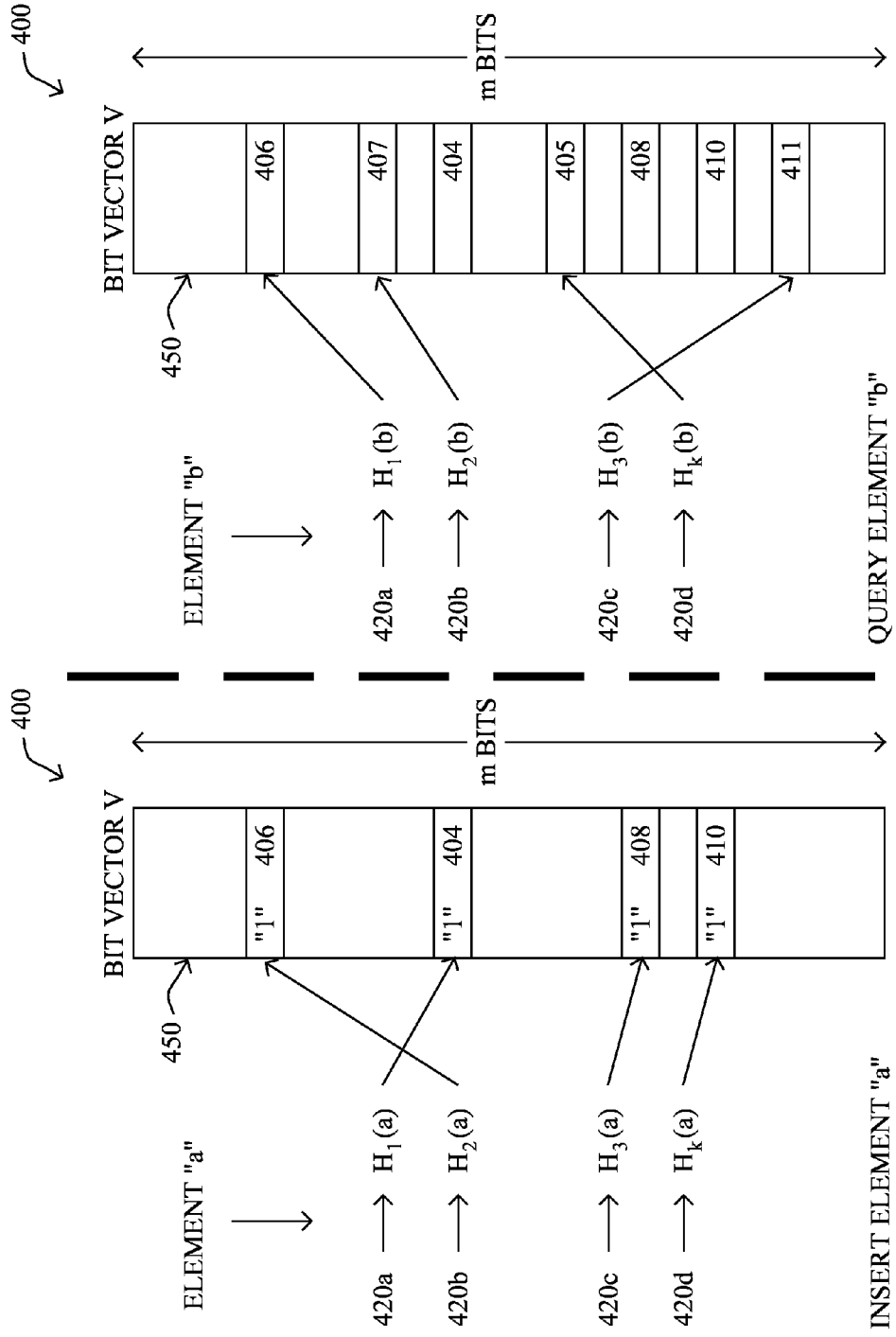
FIG. 4 illustrates an example Bloom filter.

With reference now to FIG. 4, illustrated is an example of a Bloom filter 400 with four hash functions 420a-420d. As understood by one skilled in the art, Bloom filter 400 allocates a vector v of m bits, initially all set to 0, and then choose k independent hash functions, h1, h2, . . . , hk, each with range $\{1, \ldots, m\}$. Bloom filter 400 is shown implemented with a multi-ported memory 450, where the memory 450 has k ports. In this manner, the k array positions 404, 406, 408, 410 of the memory 450 may be written or queried in parallel.

The left-hand side of FIG. 4 illustrates insertion of an element (a) into a set (A). To insert an element a member A, the bits (404, 406, 408, 410, respectively) at positions h1(a), h2(a), . . . , hk(a) in v are set to "1". (A particular bit might be set to "1" multiple times). It should be understood that "1" or "true" as used herein is not intended to be limited to any particular value. For at least one embodiment, the value "1" is implemented as a one-bit logic-high value. However, this example embodiment should not be taken to be limiting. Instead, for alternative embodiments the "1" value may be a logic-low value or may be a multi-bit value.

The right-hand side of FIG. 4 illustrates a query to determine if an element (b) is a member of the set (A). FIG. 4 illustrates that, to query for an element (to test if it is in set A), the element is fed into each of the k hash functions, resulting in k bit positions. Given a query for b, the bits (406, 407, 411, 405, respectively) at positions h1(b), h2(b), . . . , hk(b) are checked. Again, because the Bloom filter 400 illustrated in FIG. 4 is implemented with a k-ported memory 450, the k array positions (positions h1(b), h2(b), . . . , hk(b)) may be checked in parallel.

If any of the bits is "0", then b is not in the set A. (If the element were in the set, then presumably all such bits would have been set to "1" when the element was added to the set). Otherwise, if all bits are "1", then either the element is in the set, or the bits have been set to "1" during the insertion of other elements. Thus, if all bits are set to "1", it may be assumed that b is in the set although there is a certain probability that this is not true (because the bits may have been set during the insertion of other elements). The (relatively rare) case in which the bits are set for the insertion of other elements, is called a "false positive" or "false drop", when the query erroneously indicates membership in the set for element b.

In summary, a Bloom filter is a space-efficient probabilistic data structure that is used to test whether an element is a member of a set. Typically, an empty Bloom filter is a bit-vector of m bits, all set to 0 wherein there is k different hash functions defined, each of which maps an element to one of the m array positions with a uniform random distribution. To add an element to the Bloom filter, feed it to each of the k hash functions to get k array positions and set them to 1. To test whether an element is in the set, feed it to each of the k hash functions to get k array positions. If any are 0, then the element is not in the set. If all are 1, then either the element is in the set or may indicate a false positive. Again, false positives are possible, but false negatives are not. The bit-vector size depends on the number of inserted elements and desired false positive rate. For instance, a typically Bloom filters uses $1.44*\log\_2(1/r)$ bits of space per element, where r is the false positive rate of the Bloom filter. For example, to support r<1%, the Bloom filter requires 10 bits (125 bytes) per element. To support r<0.1%, the Bloom filter requires 15 bits (1.875 bytes) per element.

Illustratively, the techniques described herein may be performed by hardware, software, and/or firmware, such as in accordance with the topology management process 248, which may contain computer executable instructions executed by the processor 220 (or independent processor of interfaces 210) to perform functions relating to the techniques described herein, e.g., in conjunction with routing process 244 (and/or DAG process 246). For example, the techniques herein may be treated as extensions to conventional protocols, such as the one or more routing protocols (e.g., RPL) or other communication protocols, and as such, may be processed by similar components understood in the art that execute those protocols, accordingly.

It is to be appreciated that even though Bloom filters were developed with focus on the database community, Bloom filters have also been applied to networking in the areas of distributed caching, P2P networking, routing, and management. It is further to be appreciated that existing record route mechanisms all rely on a list of node identifiers that name the set of nodes and their relative order. In this regard, and preferably under the control of process 244 (FIG. 2), and in accordance with an illustrated embodiment, operationally, a Bloom filter is utilized and operative to compact data packet record route entries and allow recording arbitrary length record routes with a given fixed header size. Therefore, with only 1-2 bytes per entry (vs. 16 bytes per entry), Bloom filters significantly reduce the record route overhead. By operating on a fixed-size data structure, routers along the path of a computer network, such as an LLN, can continue to record information about the path even if the source did not correctly estimate the path length. It is to be understood encoding a signal includes maintaining a Bloom filter within the data packet itself which preferably encodes the identifier of each device along the signal path and their nodal hop counts.

Figure 5:
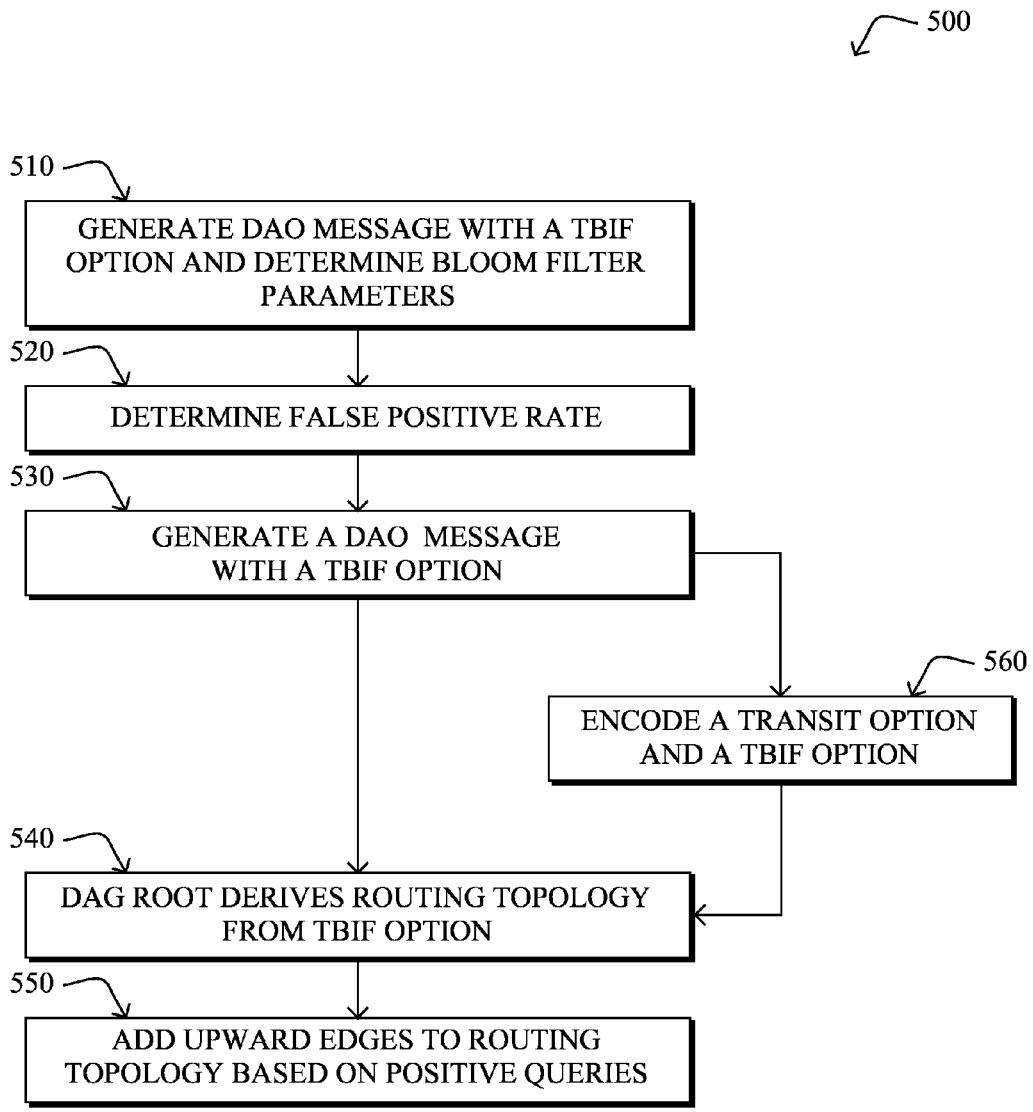
FIG. 5 illustrates an example simplified procedure for compressing data packet routing information using Bloom filters.

With reference now to FIG. 5, illustrated is a simplified procedure 500, via process 244 (FIG. 2), for reducing the record route overhead of communicating downward routing state information using Bloom filters in RPL messages or other similar tree/DAG-based routing protocols involving reporting both reachable IPv6 addresses and parent nodes of a source node. It is to be understood and appreciated that while the below illustrated embodiments are described in conjunction with RPL messaging protocols, their techniques may be applied to other tree/DAG-based routing messaging protocols and thus are not to be limited to RPL messaging protocols. For instance, the below illustrated embodiments may be used in conjunction with routing protocols such as link state protocols (OSPF, ISIS) where the size of the Linked State Advertisement (LSA) message in highly dense environments having a large number of routing adjacency may be problematic.

As noted above, a problem that confronts LLNs often occurs when a device sends a DAO messages upstream to the DAG root when in non-storing mode. In accordance with the below described illustrated embodiments, it is to be understood each DAO messages contains one or more Transit Information Options to indicate the parents of the node that generated the DAO message. By collecting the parent information from the DAO messages, the processor 220 can cause the DAG root to then re-construct the DAG routing topology. Using the routing topology, the DAG root can compute downstream routes towards an individual device, generate a source route, and include them when forwarding messages to LLN devices. Furthermore, it may be advantageous to report all parents even if only some of the parents are used in the upstream direction. It is noted alternate parents may be used by the DODAG should the preferred route be broken whereby the number of such parents may be large.

In accordance with an illustrated embodiment, a Transit Information Bloom Filter (TIBF) Option is created, preferably via process 244, for use in RPL messages. Similar to a known Transit Information Option, the TIBF Option communicates parent information for the DAO's source. However, while a known Transit Information Option only communicates a single parent, the TIBF Option, in accordance with the illustrated embodiment is configured and operative to communicate one or more parents (even all parents) preferably in the form of a Bloom filter. It is to be understood that when a TIBF Option is generated, a device preferably determines the Bloom filter parameters (step 510) based on the number of parents to encode and the desired false-positive rate for the Bloom filter (step 520). The device then preferably adds the parents' addresses (e.g., IPv6 addresses) to the Bloom filter and generates a DAO message with a TBIF Option (step 530).

The DAG root upon receiving the TBIF Option preferably derives the routing topology for the signal (e.g., network) using information provided by the TIBF Option (step 540). As previously mentioned, each DAO message includes a Target Option having reachable IPv6 addresses wherein the Target Option will often include the IPv6 address of the device that generated the DAO. Thus, from the Target Option, the DAG Root determines the IPv6 address (e.g., ID's) of each device in the RPL routing topology. In other words, the Target Option identifies the vertices of the DAG. Next, edges (i.e. links) are added to the DAG using the TIBF option. It is to be understood that when processing the TIBF Option of a DAO message, the DAG Root preferably queries the Bloom filter for each node in DAG. If the query returns a positive result, the DAG Root adds an edge to the DAG to update the routing topology (step 550).

If the query returns a false positive in the Bloom filter, this is indicative of having more than N positive queries when only N entries are encoded in the Bloom filter. In accordance with the illustrated embodiment, the occurrence of false positives may be detected by adding a field to the TIBF option that indicates the number of entries included in the Bloom filter. Thus, if the number of positives queries exceeds the number of entries, this is indicative that false positives exist for the Bloom filter. Furthermore, the occurrence of false positives may be reduced by determining whether the parent also sees the nodes reporting to that parent. Upon the occurrence of false positives by the Bloom filter, the DAG Root provides feedback to the devices preferably enabling them to dynamically adjust the size of the Bloom filter. For instance, in one illustrated embodiment, the DAG Root is caused to propagate a desired number of bits to use per entry in the bit-vector field of the Bloom filter. And in another illustrated embodiment, the DAG Root is caused to indicate the number of nodes in the network, thus allowing devices to adjust the size of the bit-vector of the Bloom filter based on the number of nodes. It is further to be understood the DAG Root may further process false positives of the Bloom filter by correcting any path errors. For example, when receiving an Internet Control Message Protocol (ICMP) Destination Unreachable error along a path, the DAG Root may delete that edge and use a different path for reaching the destination.

In accordance with another illustrated embodiment, both a Transit Option signal component and a TIBF Option signal component are encoded in a common DAO message (step 560). For instance, one or more Transit Option signal components may provide explicit identifiers for the preferred parents, while a TIBF Option signal component may encode a number of alternative parents. It is to be appreciated that while a Transit Option signal component does not suffer from false positives attributable to Bloom filter, it comes with the added cost of significantly increasing the size of the DAO message, as mentioned above. However, by bifurcating the parent set across a Transit Option signal component and a TIBF Option signal component, devices can utilize the benefits of both aforesaid signal components.

In yet another illustrated embodiment, the DAG Root may predetermine Bloom filter hash values for each node identified by the Target Option for a DAO message. It is to be appreciated predetermining the Bloom filter hash values reduces computation when performing queries.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein in accordance with the illustrated embodiments, therefore, provide a significant reduction for the cost of communicating parent set information to the DAG Root. Generally this is because a Bloom filter requires only 1 to 2 bytes of overhead per parent identifier for manageable false-positive rates, which is in contrast to 16 bytes per entry for IPv6 addresses, as is utilized with known prior methods and apparatus. Since DAO messages represent the vast majority of control message overhead, especially in non-storing mode, they must convey the entire routing topology to the DAG Root. Thus, the above described illustrated embodiments are advantageous in reducing a significant cause of control message overhead.

While there have been shown and described illustrative embodiments that provide for encoding bloom filters in a data packet to implement control plane mechanisms in a compact format, it is to be understood that various other adaptations and modifications may be made within the spirit and scope of the embodiments herein. For example, the embodiments have been shown and described herein with relation to LLN networks, and, in particular, the RPL protocol. However, the embodiments in their broader sense are not as limited, and may, in fact, be used with other types of networks and/or protocols.

The foregoing description has been directed to specific illustrated embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/

RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    generating, at a node in a network, a Transit Information Bloom Filter (TIBF) signal component for use within a routing protocol control message;
    encoding the TIBF signal component in a Bloom filter at the node, wherein the TIBF signal component in the Bloom filter at the node identifies a plurality of parent nodes for a routing topology;
    generating the Bloom filter at the node by:
    determining Bloom filter parameters based on a number of said plurality of parent nodes to be encoded;
    determining a desired false positive rate for the Bloom filter at the node; and
    encoding an address for each parent node of said plurality of parent nodes in the Bloom filter at the node; and
    sending the TIBF signal component toward a root of the node in the network, wherein the root of the node derives the routing topology from information within the TIBF signal component.

2. The method of claim 1, wherein the determined Bloom filter parameters are based on a plurality of parent nodes.

3. The method of claim 2, further including generating a Transit Option signal component identifying preferred parents wherein the TIBF signal component identifies alternative parents, and encoding each of the Transit Option signal component and the TIBF signal component in the Bloom filter.

4. A method, comprising:
    receiving, at a Directed Acyclic Graph (DAG) root node in a computer network, a Transit Information Bloom Filter (TIBF) signal component from a plurality of nodes in the computer network; and
    interpolating, by the DAG root node, the TIBF signal component to derive a routing topology,
    wherein the TIBF signal component is used within a routing protocol control message,
    wherein the TIBF signal component and a TIBF signal are encoded in a Bloom filter, and the TIBF signal component in the Bloom filter identifies a plurality of parent nodes for the routing topology, and
    wherein the Bloom filter is generated by each node of the plurality of nodes in the computer network by:
    determining Bloom filter parameters based on a number of the plurality of parent nodes to be encoded,
    determining a desired false positive rate for the Bloom filter, and
    encoding an address for each parent node of the plurality of parent nodes in the Bloom filter.

5. The method of claim 4, wherein the DAG root node predetermines hash values for the Bloom filter for each node identified by a Transit Option signal component.

6. The method of claim 4, wherein the DAG root node identifies an address of each device in the routing topology.

7. The method of claim 4 wherein links are added to the DAG root node contingent upon the TIBF signal.

8. The method of claim 7, whereby the DAG root node queries the Bloom filter for each device in correlation with adding links.

9. The method of claim 8, wherein the DAG root node adds a link once a query provides a positive result.

10. The method of claim 8, wherein a false positive result in the Bloom filter is indicative of having more than a value N of positive queries when only a value N of entries are encoded in the Bloom filter.

11. The method of claim 8, further comprising adding a field to the TIBF signal component indicative of a number of entries included in the Bloom filter to detect a false positive occurrence attributable to the Bloom filter.

12. The method of claim 11, wherein if a number of positive queries exceeds the number of entries than a determination of existence of false positives is provided.

13. The method of claim 11, whereby upon the determination of false positives, the DAG root node provides feedback to each device enabling each device to adjust the size of the Bloom filter.

14. The method of claim 13, wherein the DAG root node propagates a desired number of bits to use per entry in a bit-vector field of the Bloom filter.

15. The method of claim 13, wherein the DAG root node indicates a number of nodes in a network enabling devices to adjust a bit-vector field of the Bloom filter based on the number of nodes.

16. The method of claim 11, whereby upon the determination of false positives the DAG root node corrects link errors.

17. An apparatus, comprising:
    one or more network interfaces to communicate with a computer network;
    a processor coupled to the one or more network interfaces and adapted to execute one or more processes; and
    a memory configured to store a process executable by the processor, the one or more processes when executed operable to:
    generate a Transit Information Bloom Filter (TIBF) signal component for use within a routing protocol control message wherein the TIBF signal component identifies a plurality of parent nodes for a routing topology;
    encode the TIBF signal component in a Bloom filter, wherein the TIBF signal component in the Bloom filter identifies a plurality of parent nodes for a routing topology; and
    generate the Bloom filter by:
    determining Bloom filter parameters based on a number of the plurality of parent nodes to be encoded,
    determining a desired false positive rate for the Bloom filter, and encoding an address for each parent node of the plurality of parent nodes in the Bloom filter; and
    send the TIBF signal component toward a root of the node in the network, wherein the root of the node derives the routing topology from information within the TIBF signal component.

18. The apparatus as in claim 17 wherein the Bloom filter parameters are based on a plurality of parent nodes.

19. The apparatus as in claim 17, wherein the processor is further operable to generate a Transit Option signal component identifying preferred parent nodes wherein the TIBF signal component identifies alternative parent nodes, and encoding the Transit Option signal and the TIBF signal component in the Bloom filter.

20. An apparatus, comprising:
    one or more network interfaces to communicate with a computer network; a processor coupled to the network interfaces and adapted to execute one or more processes; and
    a memory configured to store a process executable by the processor, the process when executed operable to:
    receive a Transit Information Bloom Filter (TIBF) signal component from a plurality of nodes in the computer network, wherein the apparatus is a Directed Acyclic Graph (DAG) root node in the computer network; and interpolate the TIBF signal component to derive a routing topology, wherein the TIBF signal component is within a routing protocol control message and the TIBF signal component is encoded in a Bloom filter that identifies a plurality of parent nodes for the routing topology, wherein the Bloom filter is generated by each node of said plurality of nodes in the computer network by:

determining Bloom filter parameters based a number of plurality of parent nodes to be encoded, determining a desired false positive rate for the Bloom filter, and encoding an address for each parent node of the plurality of parent nodes in the Bloom filter.

21. The apparatus as in claim 20, wherein the DAG root node predetermines hash values for the Bloom filter for each node identified by a Transit Option signal component.

22. The apparatus as in claim 20, whereby the DAG root node queries the Bloom filter for each device in the DAG in correlation with adding device links.

23. The apparatus as in claim 22, wherein if the query provides a positive result, the processor is further operable to cause the DAG root node to add a link to the DAG.

* * * * *